Figure 2:
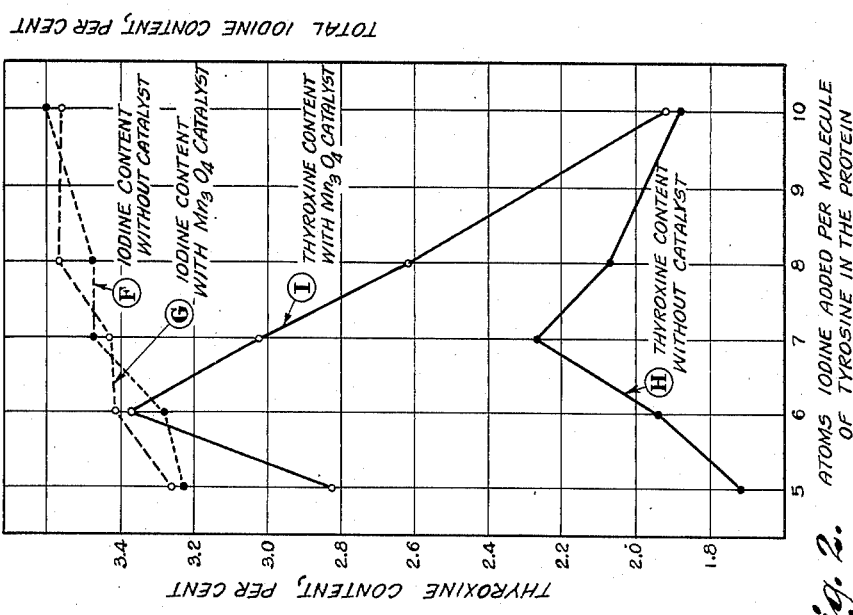

April 1, 1952     C. W. TURNER ET AL     2,591,107

METHOD OF MAKING A THYROPROTEIN FEED

Original Filed April 19, 1945

Inventors
Charles W. Turner
Ezra P. Reineke

By Thos. E. Scofield.
Attorney

Patented Apr. 1, 1952

2,591,107

UNITED STATES PATENT OFFICE 2,591,107

METHOD OF MAKING A THYROPROTEIN FEED

Charles W. Turner, Columbia, Mo., and Ezra P. Reineke, East Lansing, Mich., assignors to American Dairies Incorporated, Kansas City, Mo., a corporation of Maryland and The Quaker Oats Company, Chicago, Ill., a corporation of New Jersey, jointly Original application April 19, 1945, Serial No. 589,486. Divided and this application August 12, 1946, Serial No. 689,922. In Canada October 4, 1945

1 Claim. (Cl. 99—2)

This invention relates to improvements in a synthetic thyroprotein composition and method of making the same which has among other valuable characteristics the properties of a galactogogue or the ability of increasing the yield and the percentage composition of the most valuable constituents of milk of lactating animals and in particular dairy cows. To accomplish this function the food composition here described, upon digestion and absorption into the blood stream, has the characteristic also of increasing general body metabolism, and the use of blood precursors of milk by the mammary gland.

In addition, in suitable amounts, this food composition will favorably influence the growth rate of immature animals, the metabolic activity and general well-being of animals with low general metabolism, the production of meat, wool, eggs, and working and racing capacity of horses. More specifically our food composition influences favorably the rate of secretion by the anterior pituitary gland of hormones which influence the metabolism of fat, carbohydrates and proteins thereby reacting favorably on the physiological processes cited above.

This application is a division of our copending application Serial No. 589,248 filed April 19, 1945, which is a continuation-in-part of application, Serial 441,116, filed April 30, 1942, and issued July 3, 1945, as Letters Patent 2,379,842 and a continuation-in-part of application Serial No. 501,988 filed September 11, 1943, and issued September 18, 1945; each of the latter patents in turn was a continuation-in-part of application, Serial No. 326,422, filed March 28, 1940, and issued September 14, 1943, as Letters Patent 2,329,445.

Our invention also relates broadly to a method of increasing the rate of body growth and egg production of fowls such as chickens, turkeys, ducks and geese. More specifically it comprises the feeding of iodinated protein to normal fowls in predetermined critical amounts sufficient to favorably influence directly these processes and indirectly the rate of secretion by the anterior pituitary gland of hormones which influence the metabolic processes favorable to rapid growth and of the gonadotropic and associated hormones favorable to a high level and continued egg production (particularly egg production during seasons of normally low or reduced production). Further the egg production is thus continued at a high level with advancing age whereas normal hens decline following the first years.

We are aware that materials possessing thyroidal activities have heretofore been given to both normal and thyroprivic birds. However, administration of the material to the thyroprivic birds has no significance to this invention nor does the administration to normal birds since, to our knowledge, no one has ever had any conception or appreciation of the critical amounts necessary to obtain our results. The administration of iodinated protein to birds in amounts substantially less than we recommend has little or no effect, while the administration of amounts substantially greater actually causes a decrease in growth and egg production.

For many purposes it is desirable to effect a rapid growth in young fowls. For example, the meat of fast growing chicks is much more tender than if the growth is retarded and the total feed consumption per pound of gain is less. We are able to effect a very rapid increase in growth as compared with the normal growth by feeding iodinated protein to the growing chicks in amounts within a predetermined critical range. The amount given depends considerably upon the size and age of the bird, but the following table will illustrate the amount which we have found to be critical for growing birds of varying body weight.

Table I

| Body wt. in gms. of growing chickens | Daily feed Consumption in gms. | Iodinated Protein consumption in mg. |
|---|---|---|
| 100 | 10 | 1.0 to 8.0 |
| 200 | 27 | 2.7 to 21.6 |
| 500 | 54 | 5.4 to 43.2 |
| 1,000 | 64 | 6.4 to 51.2 |
| 1,500 | 71 | 7.1 to 56.8 |

The iodinated protein used in the experiment described above and in all experiments hereinafter described is 3 per cent as potent as synthetic thyroxine, and it can be administered to the birds in several ways. For example, it can be administered directly to the birds in capsules, but this method is generally unsatisfactory. The iodinated protein can also be coated on lime grit or cracked oyster shells which is then fed to the birds in sufficient quantity so that the requisite amounts of iodinated protein are supplied. However, in practice the iodinated protein is best given in the food ratio. We have found that iodinated protein having 3 per cent the potency of thyroxine should be mixed with the food in amounts between 0.01 per cent and 0.08 per cent. Expressed differently, between 4.5 grams and 36 grams of iodinated proteins are mixed with each 100 pounds of feed. This method of administering the iodinated protein is most efficient and convenient since the amount of iodinated protein to be given is a function of the body weight of the fowl and the amount of food consumed increases proportionately as the bird grows and its weight increases. Thus, the food consumption increases as the body weight increases and since the iodinated protein is required in increasing amounts with increasing body weight, this method of administration is self-regulatory over a broad range of body weight.

An important object of our invention is the formation of synthetic thyroprotein composition produced by combining iodine and casein, soy bean globulin, blood serum protein, or other proteinaceous material containing the amino acid tyrosine, the composition being transformed from the starting protein containing tyrosine to a protein in which tyrosine has been converted completely or in part to the amino acid thyroxine still as a component part of the starting protein. The transformed synthetic composition is a thyroprotein having new properties not present in either of the original ingredients. These new properties are demonstrated upon the injection or oral administration of the product to test animals, such as tadpoles, guinea pigs and the like, and by such tests demonstrate that the synthetic thyroprotein composition has been brought to an active state by methods hereinafter disclosed, without first having been digested by chemicals or by enzymes in vitro. The high content of thyroxine and thyroxine-like compounds found in these products may also be determined by chemical tests, hereinafter described. The biological and chemical tests reveal that the synthetic thyroprotein prepared by our methods is a unique preparation produced by synthesis and clearly differentiated in certain of its characteristics from the natural hormone of the thyroid gland. Although this synthetic thyroprotein shows high thyroidal activity when administered without previous digestion, it may nevertheless be digested by chemicals or enzymes in vitro and still exert high activity in the test animals or the separation of the amino acid thyroxine formed within the protein by our methods may be produced by processes known to the art or as disclosed in our copending application, Serial 496,952, filed July 31, 1943.

In brief, the invention resides in the preparation of a synthetic thyroprotein having physiological activity resulting from the iodination of protein-containing tyrosine, the novelty residing primarily in the discovery that native proteins of either plant or animal origin containing the amino acid tyrosine can be altered by suitable chemical treatment to form the amino acid thyroxine as a component part of the given protein molecule.

Further novelty resides in the recognition and determination of a two-step method by which is formed a synthetic thyroprotein which, if carefully controlled, results in a product having maximum physiological activity or to a maximum conversion of the amino acid tyrosine to thyroxine.

The first step of the method constitutes the recognition and control of the degree of iodination necessary to obtain maximum activity and the application of tests to determine and thereby limit iodination within this proper range as well as the recognition of the optimum pH range for this reaction to occur and control of the pH of the reaction solution within these proper limits.

The second step constitutes the recognition and determination of the influence of proper temperature conditions, stirring, aeration, or oxygenation as well as the use of certain catalysts in promoting the conversion to thyroxine of the iodinated products formed in the first step.

The method, including these two separate steps, produces the unique type of synthetic thyroprotein having high thyroidal activity hereinafter described. The product can be readily distinguished from the naturally occurring product of the thyroid gland and from previously known iodinated proteins by both biological and chemical tests. These tests not only show that our product differs from those which have preceded in degree of thyroidal activity, but also that it is a unique composition in that it has a greater number of thyroxine radicals combined in firm organic combination in the protein molecules in which they are formed. It is recognized by protein chemists that any change in the amino acid composition will change a given protein to a different protein. Thus, by practising the foregoing steps of our method and by differing to a predetermined degree the control suggested we are able to produce a series of synthetic thyroproteins differing principally in their thyroxine content and thyroidal activity as determined by chemical and biological tests.

One method of obtaining our product is as follows: Pulverized iodine is added slowly to an aqueous solution of a protein containing tyrosine, the solution having a pH value of 6.8 to 8 and being held at a temperature of 30°–45° C. Sodium bicarbonate contained in the solution acts as a buffer and neutralizes hydriodic acid formed as a side reaction. After the requisite amount of iodine has been added, the solution is placed in an uncubator and held at a temperature of 50°–100° C. for 12 to 18 hours. During the incubation period, the solution is continuously stirred with a rod of a metal such as copper, tin, zinc, brass, or combinations of these metals. The metal apparently has a catalytic effect on the solution and substantially reduces the incubation period. The iodinated protein is then removed from the solution, dried and ground to a fine powder.

Another method of producing thyroprotein of this type is the procedure which follows:

Pulverized iodine is added slowly with continuous stirring to an aqueous solution of a protein containing tyrosine, the solution having a pH value of 6.8 to 10.0 and held at a temperature of 15° C. to 70° C. Sodium bicarbonate or other mild alkali sufficient to maintain the reaction within the desired pH range acts as a buffer and neutralizes hydriodic acid, formed as a side reaction. After the requisite amount of iodine has been added the solution is placed in an incubator, water bath or suitable constant temperature device and held at a temperature of 50° C. to 100° C. It is preferred to maintain the solution at this temperature for 18 to 20 hours, although the period may be extended to as much as 72 hours without loss of activity. If the period is reduced to 2 to 4 hours some thyroidally active material is formed by considerably less than when the heat is prolonged within the range of 12 to 24 hours. The rate at which intermediate substance is converted to thyroprotein during this step is a function both of time and temperature. During the incubation period the solution should be continuously agitated or instead it may be oxygenated by introducing oxygen or air beneath the surface of the solution. At any time, either preliminary to, during, or after the iodination step but preferably before the incubation step, catalyst selected from the group including manganese sulphate ($MnSO_4$), manganese, manganous, manganic oxides (MnO) ($Mn_2O_3$) ($Mn_3O_4$) and manganese dioxide ($MnO_2$) is added. Excellent results are also obtained by adding a colloidal solution of manganese oxides formed by the reduction of potassium permanganate with glucose, as described on page 612 of a book titled "Quantitative Clinical Chemistry, Methods" by Peters and Van Slyke published in 1932. After the incubation step is complete the synthetic thyroprotein is removed from the solution by isoelectric precipitation, dried and ground to a fine powder.

Potency of the final product is dependent upon the amount of iodine added to the solution, the maintenance of the pH within optimum limits, the presence of a catalyst, the temperature and degree of saturation of the solution with oxygen during the incubation step.

Thus, it will be seen that the synthetic thyroprotein composition produced according to the above procedure is composed of two essential ingredients, protein and iodine. Casein egg albumen and soy bean protein have been found to be suitable proteins for this purpose. However, it is to be understood that other proteins such as milk protein or albumen, blood serum or its proteins, albumen and globulin, meat meal or its protein, or proteins from other animal sources, plant proteins such as are found in cottonseed meal, gluten meal, soy bean meal, peanut meal, cocoanut meal or all high proteinaceous foods may be substituted.

Molecular iodine may be used to iodinate the proteins or, if desired, a mixture of molecular iodine and potassium iodide in aqueous solution may be used.

In place of the manganese compounds used as catalyst or in addition thereto hydrogen peroxide or an organic peroxide selected from the group of benzoyl peroxide, lauroyl peroxide or acetyl benzoyl peroxide may be used to accelerate the formation of thyroxine during the incubation step.

It is known that iodine is a physiologically active constituent of thyroxine and, likewise, determines the physiological activity of synthetic protein. Thus, the amount of iodine added to the solution during the iodination step is a critical factor. If too much or too little iodine is mixed into the protein solution a thyroprotein of reduced potency is produced. To obtain a thyroprotein having maximum physiological activity it is essential that only sufficient iodine be added to substitute two atoms of iodine per molecule of tyrosine in the protein. The amount of iodine required to accomplish this depends to an extent upon the pH of the reaction medium. If only sufficient sodium bicarbonate or other mild alkali is added to maintain the pH of the solution within the range of 6.8 to 8.0 practically all of the iodine substitution will take place on the tyrosine. Under these conditions the critical amount of iodine required to produce a thyroprotein of maximum thyroidal potency has been found to be approximately 4 to 6 atoms per molecule of tyrosin in the protein. To accomplish this it is necessary to add approximately twice the amount of iodine actually combined with the protein since one-half of the iodine will be lost as hydriodic acid that is formed as a side product. The iodination of tyrosine proceeds by substitution according to the equation, tyrosine $+2I_2$ diiodotyrosine $+2HI$.

If the reaction is conducted in a more alkaline range of pH from 8 to 10, some of the iodine will also be used for substitution on the imidazole ring of the histidine and oxidation of tryptophane and cysteine that occur as constituent amino acids of most proteins. Under these conditions a larger but still critical amount of iodine is required to bring about the desired substitution of two atoms per molecule of tyrosine in the protein. This critical amount has been found to be approximately 5 to 10 atoms of iodine.

It has also been found that under either of the pH conditions described hereinabove there are several ways of determining exactly when the right amount of iodine has been added to the protein. One test is to slowly mix small amounts of iodine into the protein until a starch test for free iodine is obtained for 5 to 10 minutes after the addition of iodine. While the starch test is generally satisfactory more precise results are obtained by the biuret or Millon tests. It has been found that exactly the right amount of iodine is added to produce a thyroprotein of maximum thyroidal activity when the Millon test becomes negative or when the biuret test of the solution changes from a violet to a blue or blue-violet coloration.

By thus regulating the amount of iodine added together with the previously described steps there is converted the intermediate iodinated products into thyroxine. Subsequent to iodination there is produced a series of artificial thyroproteins whose characteristics depend to a great extent upon the conditions employed in processing. For example, there were produced products which contained from 3% to 15% of total iodine and from 0.28% to 4% of thyroxine as determined by chemical analysis. The products exert a metamorphosis stimulating effect on tadpoles ranging from 0.75% to 11% of the effect of natural l-thyroxine or 1.5% to 22% of the effect of racemic thyroxine when equal weights of the respective compounds are compared. When tested by their ability to stimulate the metabolism of guinea pigs the thyroproteins produce a response in the range of 0.28 to 4% of the effect produced by natural l-thyroxine or 0.56% to 8% of the effect of racemic thyroxine which is commonly a standard for comparison. It is thus seen that the synthetic thyroproteins prepared according to the suggested procedure have a relatively greater effect on tadpole metamorphosis than on metabolism whereas natural thyroproteins obtained from the thyroid seem to exert either an equal or greater effect on metabolism than on metamorphosis. In spite of the unavoidable losses involved in isolation procedures our highly active thyroprotein has yielded 0.5% of chemically pure thyroxine when the thyroprotein is hydrolyzed with barium hydroxide and the hydrolytic products are subjected to known purification methods for the isolation of thyroxine. While the chemical and biological assays cited are given to illustrate the potency of products that are obtained under ordinary conditions it is not intended to limit the procedure to the particular conditions described. For example, it is entirely possible that by skillful manipulation of the procedural steps disclosed a thyroprotein can be produced that has 2 to 2½ times the thyroxine content and physiological activity expressed by the assay figures given.

When fed to thyroidectomized animals these synthetic thyroproteins entirely replace the natural secretion of the thyroid gland. When administered to man and all types of animals they elevate the metabolic rate roughly in proportion to the dosage given. When fed in suitable amounts they increase the rate of milk production and growth of normal animals and the rate of body growth, feather growth and egg production of normal fowls.

Figure 1:
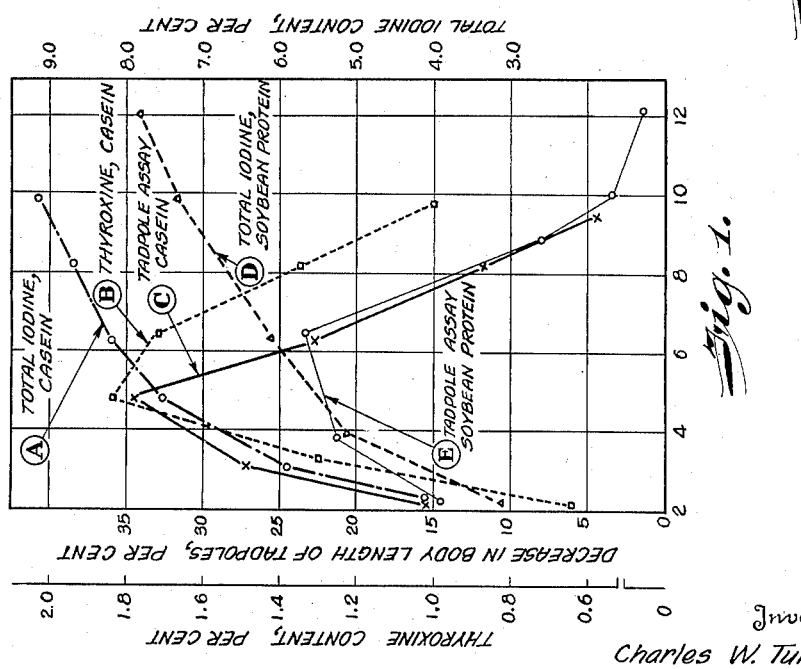

In this regard attention is directed to Fig. 1 of the drawings wherein it is shown that in a thyroprotein first iodinated at a pH of 6.8 to 8.0 and then held at a temperature of 50° to 100° C. for a number of hours, the amount of iodine added to the protein is a critical factor in the formation of a thyroprotein having maximum thyroidal activity.

The ability of a substance to stimulate the metamorphosis of frog tadpoles is a well known test of thyroidal activity. Another recognized test in the chemical determination of the thyroxine content by hydrolysis of the protein with alkali and extraction of the thyroxine from the physiologically inert portions of the hydrolysate with normal butyl alcohol.

Two series of tests were made to determine the effect of combining increasing increments of iodine with protein on the thyroxine content and the metamorphosis stimulating effect of the resulting thyroproteins. For each of the two series of tests samples of thyroprotein containing an increasing number of iodine atoms per molecule of tyrosine were prepared.

As shown by the abscissa numbers of the graph Fig. 1 six samples were prepared containing 2 to 10 atoms of iodine per molecule of tyrosine in Series I (casein) and from 2 to 12 atoms of iodine per molecule of tyrosine in Series II (soy bean protein). The ordinate numbers of the graph show the thyroxine analyses of Series I preparations and the iodine content and response of tadpoles to the Series I and II preparations.

A detailed description of the manner in which the iodinated proteins were prepared and tested follows:

SERIES I

The first series of iodinated proteins were produced by the iodination of casein. Six separate solutions were made, each of which contained 20 gms. of casein mixed with 700 ml. of distilled water to which 5 gms. of sodium bicarbonate had previously been added and the containers were placed in a water bath maintained at 38° C.–40° C. (This is the preferred temperature for iodination although it may be conducted satisfactorily at any temperature within the range of approximately 15° C. to 70° C.)

Progressively increasing amounts of finely powdered iodine were mixed into the separate solutions. For example, two atoms of iodine per molecule of tyrosine were added to one solution, 3 atoms of iodine per molecule of tyrosine were added to a second solution, etc. When the selected progressively increasing amounts of iodine had been added to each of the separate solutions the respective containers were closed to avoid evaporation of water with rubber stoppers having holes large enough for the insertion of stirring rods. Stirring motors were attached to the rods and speed of the motors adjusted to 600 R. P. M. and the temperature of the water bath increased to 70° C. It is contemplated that temperatures ranging from 50° C. to 100° C. may be used but a temperature of 70° C. seems to be a preferred condition for incubation. The solutions were stirred at this temperature and at the rate indicated for 20 hours although this period may be varied between 12 hours to 72 hours with similar results. The pH of the solutions throughout the process was within the range of 6.8 to 8.

After stirring for the period indicated the respective solutions were placed in cellophane bags and dialyzed for 20 hours to 24 hours against flowing tap water to remove the inorganic and loosely bound iodine. Recovery of the thyroprotein at this point may be accomplished by precipitation instead of dialyzation. In either event the thyroprotein is then recovered by adding dilute hydrochloric acid until the point of maximum precipitation is reached (pH 3.8 to 4.0). The precipitate was collected by filtering after which it was dried and ground to a fine powder.

SERIES II

In the second series of iodinated proteins a soy bean powder containing 4.22% tyrosine was used. Six solutions were prepared, each of which contained 20 gms. of soy bean protein mixed with 700 ml. of distilled water to which 5 gms. of sodium bicarbonate had been previously added. The remainder of the process was then carried out in the manner described for the first series.

CHEMICAL DETERMINATION OF THYROXINE

In the chemical determination of thyroxine use was made of the fact that thyroxine is readily soluble in N-butyl alcohol whereas other iodine compounds that occur in the product, such as diiodotyrosine or inorganic salts of iodine, are substantially insoluble in N-butyl alcohol. In brief, the thyroprotein is completely hydrolyzed by chemical means, preferably, with 40% barium hydroxide solution in order to release the thyroxine from its combination in the protein. The thyroxine is selectively extracted from most of the other hydrolytic products with N-butyl alcohol. The N-butyl alcohol extract is purified with sodium hydroxide solution which removes non-thyroxine impurities. Finally, the iodine content of the purified N-butyl alcohol extract is determined. This measure is termed the thyroxine-iodine or "N-butyl alcohol soluble iodine." The thyroxine content is then obtained by multiplying the percentage of N-butyl alcohol soluble iodine by the factor 1.529.

*Procedural details*

Exactly 1.0 gm. of thyroprotein is placed in a 25 x 200 mm. test tube and 6.4 ml. of distilled water and 4.2 gms. $Ba(OH)_2.8H_2O$ are added. After mixing, a reflux condenser is attached and the test tube is placed in a boiling water bath for 18 to 20 hours. The contents of the tube are then diluted with 50 ml. of distilled water, mixed well, and then allowed to settle. The aqueous portion is decanted into a 100 ml. volumetric flask. The solid matter remaining in the bottom of the test tube is dissolved by adding 2 ml. of N-butyl alcohol and 5 ml. of 3.5 N hydrochloric acid, after which the solution is added to the portion previously placed in the volumetric flask and sufficient distilled water is added to bring the volume of the solution to exactly 100 ml. After thorough mixing 20 ml. of the hydrolysate are pipetted into a separatory funnel adjusted to a pH value of 4.0 to 3.5 and extracted by shaking with 20 ml. of N-butyl alcohol. The aqueous layer of solution is discarded and the N-butyl portion now containing the thyroxine solution is washed by mixing the solution successively with an equal volume of water solution containing 16% sodium hydroxide and 5% sodium carbonate and a one-half volume of water solution containing 16% sodium hydroxide and 5% sodium carbonate. After each washing operation the N-butyl alcohol portion of the solution is retained and the alkaline aqueous portion is discarded. The purified N-butyl alcohol extract is then placed in a nickel crucible, the alcohol is removed by evaporation and the iodine content of the residue is determined by the usual methods.

*Tadpole test—Fig. 1*

In the tadpole test each preparation is administered to 10 frog tadpoles (*Rana pipiens*). Exactly 40 micrograms of each preparation were injected into each of the animals in its respective test group. Therefore, the average per cent decrease in body length of the tadpoles in the various groups provides an index of the relative potency of the thyroprotein tested in that group as compared to the potency of the preparations tested in the other groups.

In this connection attention is directed to Fig. 1 wherein it is shown that the amount of iodine added to the protein under the conditions described is a critical factor in the formation of a thyroprotein having maximum thyroidal activity.

The line designated by the letter "A" in Fig. 1 shows graphically the effect of progressively increasing amounts of iodine to the casein solutions of the first series on the total iodine content of the thyroprotein formed. It will be noted that although the iodine content increased progressively it was at a decreasing rate in the successive preparations.

The line designated by the letter "B" in Fig. 1 shows the effect of increasing degrees of iodination on the amount of thyroxine formed in the thyroprotein. Line "C" illustrates the effect of the various thyroproteins in stimulating the metamorphosis of tadpoles. Both are specific measures of thyroid activity.

The biological activity, as shown by the tadpole tests, and thyroxine formation, as indicated by the thyroxine analyses, increased with increasing iodination until approximately 4 to 6 atoms of iodine had been added per molecule of tyrosine in the protein.

The line lettered D in Fig. 1 shows the effect of increasing additions of iodine on the amount of iodine combined with soy bean protein.

Line E in Fig. 1 illustrates the rise in thyroidal activity with increasing iodination, as measured by the tadpole test, and its decline as the critical amount of iodine is exceeded. Also it is shown that under predetermined conditions maximum thyroidal activity is obtained when 4 to 6 atoms of iodine per molecule of tyrosine is added. This is the amount of iodine required under conditions of iodination where two atoms of iodine are substituted on each molecule of tyrosine. When this amount of iodine has been added the Millon test becomes negative. Thus, this test affords an accurate control for the iodination step of the process to obtain a thyroprotein possessing maximal thyroidal activity. Limitation of the iodine added to this amount or until the Millon test becomes negative during the iodination step is essential if a product of maximum physiological potency is to be obtained in the subsequent treatment during the incubation step.

In the example given the iodinated protein was incubated at 70° C. for 20 hours. Incubation at 70° C. (effective range being 50° C. to 100° C.) brings about maximal conversion of the intermediate iodinated protein formed in the iodination into thyroprotein of high thyroidal activity resulting as a final product. However, we have found that a final product of even greater thyroidal potency can be obtained if in addition to correct control of the iodine added and an accurately maintained incubation temperature there is added a catalyst containing manganese and/or a peroxide compound and the solution is kept saturated with oxygen either through vigorous stirring or by bubbling oxygen or air through it. We have also found that if the reaction is conducted in a more alkaline range of pH 8 to pH 10 more iodine is required to complete the first step of the process, that is, to complete the substitution of 2 atoms of iodine per molecule of tyrosine in the protein and cause the Millon reaction to become negative. Also the thyroprotein formed has a higher thyroxine content. Two series of thyroproteins were prepared to illustrate the effect of a manganese catalyst and increased alkalinity on thyroprotein potency. Both series were prepared by iodination of casein.

EFFECT OF CATALYSTS AND INCREASED ALKALINITY ON THYROPROTEIN POTENCY

*First series*

For the first series 5 solutions were made, each of which contained 20 gms. of casein mixed with 700 ml. of distilled water. To each of the solutions sodium bicarbonate was added in the amounts indicated below:

|  | gms. |
|---|---|
| First solution | 5.4 |
| Second solution | 6.4 |
| Third solution | 7.5 |
| Fourth solution | 9.6 |
| Fifth solution | 10.6 |

The above amounts were calculated as necessary to keep the pH of the respective solutions within the desired range of pH 8 to pH 10 during the subsequent iodination and incubation. Separate vessels, each containing one of the solutions, were placed in a water bath and held at a temperature of 38° C. to 40° C. Although this selected temperature is preferred, iodination can be performed satisfactorily within the range of 15° C. to 70° C. Progressively increasing amounts of finely powdered iodine were mixed into the individual solutions. Five atoms of iodine per molecule of tyrosine in the protein or the amount of iodine that produced the maximum thyroxine content in the series previously described was added to the first solution. Six atoms of iodine per molecule of tyrosine were added to the second solution, etc. When the selected amount of iodine had been added to each solution the temperature of the water bath containing the respective solutions was elevated to 70° C. (a range of from 50° C. to 100° C. is effective and contemplated). The stirring motors were adjusted to a speed of 600 R. P. M. and the solutions were stirred constantly at this rate and temperature for 20 hours (which time may range from 12 hours to 72 hours). The pH of all the solutions throughout the process was within the range of 8 to 10.

After iodination the separate solutions were placed in cellophane bags and dialyzed for 20 to 24 hours against flowing tap water. At this point the thyroprotein may be recovered by precipitation instead of dialyzation to remove the inorganic and loosely bound iodine. The thyroprotein was then precipitated by adding dilute hydrochloric acid after which it was recovered by filtration, dried and finely ground.

Second series

In the second series five solutions of casein were made and iodinated according to the procedure described in the first series. When all the iodine had been combined but before the incubation step a catalyst comprising 20 mg. of the oxides of manganese (MnO), ($MnO_2$), ($Mn_2O_3$) and ($Mn_3O_4$) were added to each of the solutions and then the remainder of the process was carried out as in the first series. In this series the amount of catalyst used was equivalent to one-tenth per cent of the protein in solution. The amount of catalyst used, however, does not seem to be critical, good results being obtained when amounts of 0.01% to 2.0% of the casein to be iodinated are used. The catalyst may be added either before the iodination step or before the incubation step with similar results. During the incubation step the catalyst accelerates the conversion of the intermediate iodinated protein formed during the iodination step into a thyroprotein capable of exerting a high physiological effect and containing maximum amounts of thyroxine.

Other catalysts, besides the oxides of manganese, which have been found effective are manganese sulfate ($MnSO_4$) and solutions of manganese oxides formed by the reduction of potassium permanganate ($KMnO_4$).

CRITICAL NATURE OF IODINE ADDED UNDER SPECIFIC pH CONDITIONS AND RESULTANT THYROXINE CONTENT

The graph, Fig. 2, shows the critical nature of the iodine added to the protein under specified pH conditions and also the enhancement of the thyroxine content brought about by the manganese catalyst. Lines designated by the letters "F" and "G," respectively, indicate the total iodine content of the protein incubated in the absence and presence of $Mn_3O_4$. In both cases the iodine content increased when increasing amounts were added.

Line "H" illustrates the effect of increasing additions of iodine on the thyroxine content of the thyroprotein in the absence of a catalyst.

Line "I" illustrates the effect of increasing additions of iodine on the thyroxine content of the thyroprotein in the presence of the catalyst ($MN_3O_4$).

The thyroxine content increased with increasing iodination until 6 to 7 atoms of iodine had been added per molecule of iodine in the protein and thereafter declined. The Millon test also became negative when these amounts of iodine had been added. By use of this test or procedure the exact point at which the addition of iodine should cease in order to obtain a thyroprotein of maximum potency can be accurately determined. Throughout the iodination range the products prepared in the presence of the catalyst had a higher thyroxine content ranging from 2.92% to 3.37%. The thyroxine content of the products prepared without the catalyst ranged from 1.71% to 2.28%. Other influencing factors upon the amount of thyroxine formed in the iodinated protein when the iodine added to the protein is limited to 4 atoms to 6 atoms per molecule of tyrosine are the temperature of incubation, the addition of an oxidation catalyst and the extent to which the solution is kept saturated with oxygen regardless of whether the oxygen is introduced by stirring or by directly bubbling oxygen or air through it. The effect of these various factors on the thyroxine content of the iodinated protein is illustrated in Table I.

Table I

| Prep. No. | Protein used | Iodination Temperature, °C. | Incubation Temp., °C. | Catalyst | Stirring | Thyroxine Content, Per Cent | N-butyl Alcohol Soluble Iodine Content, Per Cent |
|---|---|---|---|---|---|---|---|
| 1 | Skim-milk | 37 | 37 | None | Very gentle | .328 | .214 |
| 2 | do | 37 | 37 | do | do | .264 | .173 |
| 3 | do | 37 | 37 | do | do | .274 | .179 |
| Average | | | | | | 0.289 | .189 |
| 4 | Casein | 38–40 | 70 | None | 300 R. P. M. | 1.674 | 1.095 |
| 5 | do | 38–40 | 70 | do | 600 R. P. M. | 1.734 | 1.134 |
| 6 | do | 38–40 | 70 | do | 600 R. P. M. | 1.800 | 1.177 |
| 7 | do | 38–40 | 70 | do | 600 R. P. M. | 1.747 | 1.143 |
| 8 | do | 38–40 | 70 | do | 600 R. P. M. | 1.832 | 1.198 |
| Average | | | | | | 1.757 | 1.149 |
| 9 | Casein | 38–40 | 70 | $Mn_3O_4$ | 300 R. P. M. | 1.942 | 1.270 |
| 10 | do | 38–40 | 70 | $Mn_3O_4$ | 300 R. P. M. | 1.986 | 1.299 |
| Average | | | | | | 1.964 | 1.284 |
| 11 | Casein | 38–40 | 70 | $Mn_3O_4$ | 600 R. P. M. | 2.717 | 1.777 |
| 12 | do | 38–40 | 70 | $Mn_3O_4$ | 600 R. P. M. | 2.928 | 1.915 |
| 13 | do | 38–40 | 70 | $Mn_3O_4$ | 600 R. P. M. | 3.028 | 1.980 |
| 14 | do | 38–40 | 70 | $Mn_3O_4$ | 600 R. P. M. | 2.776 | 1.816 |
| 15 | do | 38–40 | 70 | $Mn_3O_4$ | 600 R. P. M. | 2.802 | 1.833 |
| 16 | do | 38–40 | 70 | $Mn_3O_4$ | 600 R. P. M. | 3.041 | 1.989 |
| Average | | | | | | 2.882 | 1.885 |
| 17 | Casein | 38–40 | 70 | Oxides from reduction of $KMnO_4$ | 600 R. P. M. | 2.967 | 1.940 |
| 18 | do | 38–40 | 70 | Oxides from reduction of $KMnO_4$ | 600 R. P. M. | 2.962 | 1.937 |
| 19 | do | 38–40 | 70 | Oxides from reduction of $KMnO_4$ | 600 R. P. M. | 2.600 | 1.700 |
| Average | | | | | | 2.843 | 1.859 |

*Table I*—Continued

| Prep. No. | Protein used | Iodination Temperature, °C. | Incubation Temp., °C. | Catalyst | Stirring | Thyroxine Content, Per Cent | N-butyl Alcohol Soluble Iodine Content, Per Cent |
|---|---|---|---|---|---|---|---|
| 20 | Casein | 38–40 | 70 | $MnO_2$ | 600 R. P. M. | 2.159 | 1.412 |
| 21 | do | 38–40 | 70 | $MnO_2$ | 600 R. P. M. | 2.189 | 1.432 |
| Average | | | | | | 2.174 | 1.422 |
| 22 | Casein | 38–40 | 70 | $Mn_2O_3$ | 600 R. P. M. | 2.264 | 1.481 |
| 23 | do | 38–40 | 70 | $Mn_2O_3$ | 600 R. P. M. | 2.325 | 1.521 |
| Average | | | | | | 2.295 | 1.501 |
| 24 | Casein | 38–40 | 70 | $MnSO_4$ | 600 R. P. M. | 1.999 | 1.307 |
| 25 | do | 38–40 | 70 | $MnSO_4$ | 600 R. P. M. | 2.133 | 1.395 |
| Average | | | | | Oxygen | 2.066 | 1.351 |
| 26 | Casein | 38–40 | 70 | $Mn_3O_4$ | Bubbled through the solution | 4.100 | 2.681 |

In the above table one group of preparations was produced by the iodination of skim milk:

To 700 ml. of fresh skim milk 5 gms. of sodium bicarbonate were added, the solution was warmed to 37° C. and then 4.3 gms. of powdered iodine were added slowly with continual stirring. The solution was incubated for 18 to 20 hours with very gentle stirring after which it was precipitated, filtered and dried.

The remaining preparations of Table I were formed by the iodination of casein by the usual procedure:

20 gms. of casein were dissolved in 700 ml. of distilled water containing 5 gms. of sodium bicarbonate. The solution was placed in a water bath at 38° C. to 40° C. and 3.7 gms. of powdered iodine were mixed into the solution over a period of 3 to 4 hours. The incubation procedure was varied in the separate preparations with respect to the amount of stirring or oxygenation of the solution, the character of catalyst used and the temperature maintained as indicated in the table. The amount of iodine added to all of the solutions was just sufficient to substitute 2 atoms per molecule of tyrosine in the protein and as the last iodine was added to each the Millon test became negative.

As shown in Table I, preparations iodinated and incubated at 37° C. with no catalyst and a minimum of stirring contained an average of 0.289% thyroxine or 0.189% N-butyl alcohol soluble iodine. Increasing the stirring speed to 600 R. P. M. and the incubation temperature to 70° C. increased the thyroxine content to 1.757% or the N-butyl alcohol soluble iodine to 1.149%. Addition of a mild oxidation catalyst, as indicated, caused an increase of between .964% thyroxine to 1.284% N-butyl alcohol soluble iodine and 2.882% thyroxine or 1.885% N-butyl alcohol soluble iodine depending upon the catalyst selected and the stirring speed. Bubbling oxygen through the solution and using a catalyst the thyroxine content was increased to 4.100% or the N-butyl alcohol soluble iodine to 2.681%.

From the results disclosed it will be seen that the formation of a synthetic protein having high thyroidal activity is dependent upon the control of a number of critical factors. The process can be visualized broadly as a two-stage reaction, although it is believed that the protein actually goes through a series of intermediate transitions in changing from an iodine-free protein to an iodinated protein with little or no thyroidal activity or thyroxine content and finally to a thyroprotein possessing high thyroidal activity and high thyroxine content.

The first stage occurs when the protein is iodinated. While it is not desired to limit the invention to any specific procedure, the successive transitions or changes which take place in the product according to present knowledge seems to indicate that in the first step, when the protein is iodinated, an intermediate iodinated protein is formed that can be subsequently converted into an entirely thyroidally active material during the incubation period. The maximum formation of this intermediate product seems to be dependent on holding the iodine addition to approximately the amount required to substitute 2 atoms of iodine per molecule of tyrosine in the protein. At this juncture the Millon test becomes negative. While a part of the intermediate substance may be converted to the active form during iodination, tests indicate that all or substantially all of this conversion takes place during the incubation step at a temperature of 50° C. to 100° C. It appears that this conversion is promoted by maintaining mildly oxidative conditions in the solution of iodinated protein during the incubation period. One means of doing this is by the addition of a mild oxidation catalyst such as the manganese compounds hereinbefore specified. A second factor favoring this condition is the introduction of molecular oxygen into the solution either by vigorous stirring or by direct aeration or oxygenation. A third method for promoting the conversion of intermediate iodinated protein into highly active thyroprotein is by introducing as a source of free or active oxygen a peroxide such as hydrogen peroxide or, preferably, an organic peroxide selected from the group benzoyl peroxide, lauoyl peroxide or acetyl benzoyl peroxide. The full conditions for use of each of these compounds are yet to be determined. The synthetic thyroprotein formed by the procedural steps described produce all of the physiological effects of thyroxine or natural thyroid gland substance. The synthetic thyroprotein composition, however, differs from that of all known products of the thyroid gland in several important respects and these are graphically shown in Table II, which follows:

*Table II*

COMPARISON OF SYNTHETIC THYROPROTEIN WITH NATURAL THYROID HORMONE

| Natural Thyroid Protein (thyroglobulin) | Synthetic thyroprotein |
|---|---|
| 1. Source<br>Thyroid gland | 1. Source<br>Formed in vitro as described |
| 2. Solubility<br>Soluble in water, sodium chloride or dilute alkali. | 2. Solubility<br>Insoluble in water or sodium chloride solution, soluble in dilute alkali. |
| 3. Iodine content<br>Range 0–0.86%<br>Species:<br>Sheep—0.39%<br>Pig—0.46%<br>Ox—0.86%<br>Calf—0.66%<br>Calf (goitrous) 0.00% | 3. Iodine content<br>Range 3–15%<br>Optimum 7–8% |
| 4. Thyroxine content<br>0.0046–0.38% | 4. Thyroxine content<br>0.3–4.0% |

It will be seen that the synthetic thyroproteins formed by the procedure described contain, depending upon the specified manner in which the steps are conducted, from 3% to 15% of organically combined iodine and from 0.3% to 4% thyroxine. The maximum values reported for natural thyroid hormone preparations are 0.86% iodine and 0.38% thyroxine. Our synthetic thyroprotein, when of low potency, has a thyroxine content within the limits reported for natural thyroid products and is clearly differentiated from them by its much higher iodine content. The high thyroxine content of our synthetic thyroprotein as well as its high biological activity seems to define its principal unique characteristics over what has gone before and differentiates it from previously disclosed iodinated proteins.

One of the principal methods of recognizing differences in composition of proteins is by determining the proportions of the various amino acids combined in the proteins. It has been shown that the synthetic thyroprotein produced by the instant process differs from natural thyroid proteins in one important respect, namely, the thyroxine content. Another difference from thyroglobulin which is conspicuous is the proportion of amino acids, other than thyroxine, contained in the synthetic thyroprotein. Thus, while the thyroxine content of the synthetic thyroprotein will normally fall within the range of 0.3% to 4.0% depending upon the original tyrosine content of the protein and the method of iodination and incubation employed, the proportions of the non-thyroxine amino acids will also be different than in natural thyroid hormone, the exact proportions depending upon the amino acid composition of the protein used as starting material. In Table III is scheduled the known amino acid content of thyroglobulin as compared with that of casein, thyroprotein formed from casein and typical uniodinated proteins which can be converted to thyroprotein by our process.

*Table III*

COMPARISON OF AMINO ACID CONTENT OF THYROGLOBULIN, ANIMAL AND PLANT PROTEINS BEFORE AND AFTER TREATMENT

[Protein, percentage, composition.]

| Amino Acids | Thyroglobulin | Casein | Casein Thyroprotein | Egg Albumin | Zein (Corn Protein) | Soybean Protein | Peanut Protein |
|---|---|---|---|---|---|---|---|
| Thyroxine | .0046–.38 | 0 | 0.3–4.0 | 0 | 0 | 0 | 0 |
| Tyrosine | 3.0 | 5.65 | 0 | 4.2 | 5.0 | 4.1 | 4.4 |
| diiodotyrosine | 0.6 | 0 | 11.5–7.5 | 0 | 0 | 0 | 0 |
| Arginine | 7.4 | 4.1 | 3.8 | 5.7 | 1.6 | 5.8 | 9.9 |
| Histidine | 3.0 | 2.5 | 2.3 | 1.8 | 0.9 | 2.3 | 2.1 |
| Lysine | 5.5 | 6.9 | 6.4 | 4.5 | 0 | 5.4 | 3.0 |
| Tryptophane | 1.9 | 1.8 | 1.7 | 1.4 | 0.1 | 1.6 | 1.0 |
| Phenylalanine | | 5.2 | 4.9 | 6.0 | 6.4 | 5.7 | 5.4 |
| Cystine | 4.3 | 0.36 | .34 | 1.7 | 0.9 | 0.6 | 1.6 |
| Methionine | 1.3 | 3.5 | 3.3 | 5.0 | 2.4 | 2.0 | 0.9 |
| Serine | | 6.5 | 6.1 | 7.6 | | | |
| Threonine | | 3.9 | 3.6 | 3.5 | 2.4 | 4.0 | 1.5 |
| Leucine | | 12.1 | 11.3 | 9.4 | 23.0 | 6.6 | 5.5 |
| Isoleucine | | 6.5 | 6.1 | | 4.3 | 4.7 | 3.4 |
| Valine | | 7.0 | 6.5 | 6.8 | 2.4 | 4.2 | 4.0 |
| Glutamic Acid | | 22.8 | 21.3 | 16.3 | 35.6 | | |
| Aspartic Acid | | 6.3 | 5.9 | 8.2 | 3.4 | | |
| Glycine | | 0.5 | 4.7 | 1.9 | 0 | | 5.6 |
| Alanine | | 5.6 | 5.2 | 7.4 | 9.9 | | |
| Proline | | 8.2 | 7.7 | 4.5 | 10.5 | | |
| Hydroxyproline | | 2.0 | 1.9 | | 1.0 | | |

Containing 7.0% total iodine.

It will be seen that when casein is treated according to the steps of our process, the tyrosine is replaced by thyroxine and diiodotyrosine and the percentage composition by weight of the other amino acids is reduced in proportion to the amount of iodine combined. Similar changes occur in the other proteins when they are used to form thyroprotein. From the data shown in the table it is apparent that in addition to the differences in thyroxine content, diiodotyrosine content and total iodine content thyroproteins formed from these proteins also differ from thyroglobulin in their content of various of the non-thyroxine amino acids.

Having thus described our invention, we claim:

A method of making an animal or poultry feed supplement containing iodine and protein which comprises intermixing in wet condition an iodine source material and a protein containing material having an affinity for iodine and thereafter drying the mixture to form a product in which the iodine content is stabilized.

CHARLES W. TURNER.
EZRA P. REINEKE.

REFERENCES CITED

The following references are of record in the file of this patent:

UNITED STATES PATENTS

| Number | Name | Date |
|---|---|---|
| 2,382,193 | Whitmoyer | Aug. 14, 1945 |